(12) United States Patent
Kawashima

(10) Patent No.: US 7,750,722 B2
(45) Date of Patent: Jul. 6, 2010

(54) CHARGE PUMP CIRCUIT AND NONVOLATILE MEMORY

(75) Inventor: Nan Kawashima, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 12/156,903

(22) Filed: Jun. 4, 2008

(65) Prior Publication Data

US 2008/0303585 A1 Dec. 11, 2008

(30) Foreign Application Priority Data

Jun. 8, 2007 (JP) ............................. 2007-152328

(51) Int. Cl.
*G05F 1/10* (2006.01)
(52) U.S. Cl. ..................................................... 327/536
(58) Field of Classification Search ................. 327/536, 327/538, 390, 589
See application file for complete search history.

(56) References Cited

U.S. PATENT DOCUMENTS

| 5,499,183 | A | * | 3/1996 | Kobatake | 363/59 |
|---|---|---|---|---|---|
| 5,821,805 | A | * | 10/1998 | Jinbo | 327/535 |
| 6,686,792 | B2 | * | 2/2004 | Nakamiya et al. | 327/535 |
| 7,253,676 | B2 | * | 8/2007 | Fukuda et al. | 327/536 |
| 7,427,891 | B2 | * | 9/2008 | Sakurai et al. | 327/536 |
| 7,449,937 | B2 | * | 11/2008 | Takeyama | 327/536 |
| 7,495,501 | B2 | * | 2/2009 | Iwabuchi et al. | 327/536 |

OTHER PUBLICATIONS

Patent Abstracts of Japan, publication No. 2002-233134, publication date Aug. 16, 2002.

* cited by examiner

*Primary Examiner*—Lincoln Donovan
*Assistant Examiner*—Hai L Nguyen
(74) *Attorney, Agent, or Firm*—Adams & Wilks

(57) ABSTRACT

A charge pump circuit has an input voltage generating circuit and a voltage step-up circuit. The input voltage generating circuit has a constant current circuit that generates a constant current, a charge transfer correction device that generates a correction voltage based on the constant current, a constant voltage circuit that generates a constant voltage, and a buffer amplifier that outputs an input voltage obtained by adding the correction voltage to the constant voltage. The voltage step-up circuit has charge transfer devices, capacitors and a clock driver. The charge transfer devices are connected in series to an output terminal of the buffer amplifier and are made of the same element as and have substantially the same characteristic as that of the charge transfer correction device. Each of the capacitors has one end connected to each connection point of each of the plurality of charge transfer devices. The clock driver uses the input voltage as a power supply voltage, generates clock pulses having opposite phases based on the power supply voltage, and alternately supplies the clock pulses to another end of each of the plurality of capacitors.

22 Claims, 2 Drawing Sheets

CHARGE PUMP CIRCUIT AND NONVOLATILE MEMORY

BACKGROUND OF THE INVENTION

1. Field of the Invention

The present invention relates to a charge pump circuit.

2. Description of the Related Art

A conventional charge pump circuit is described. FIG. 3 is a diagram illustrating a three-stage charge pump circuit. The conventional charge pump circuit includes diodes D01 to D04 connected in series, capacitors C01 to C03, an output capacitor C0L, a clock driver 201, and an output load 202.

A power supply voltage VDD is applied as an input voltage to an anode of the diode D01. The clock driver 201 converts supplied clock pulses CLK and CLKX into clock pulses CLK2 and CLKX2 having voltage amplitudes based on the power supply voltage VDD so as to output the converted clock pulses CLK2 and CLKX2. The clock pulses CLK and CLKX and the clock pulses CLK2 and CLKX2 have opposite phases to each other, respectively. The clock pulse CLK2 is supplied to the capacitor C01 and the capacitor C03. The clock pulse CLKX2 is supplied to the capacitor C02. A stepped-up voltage is delivered from a cathode of the diode D04 and is accumulated in the output capacitor C0L.

A voltage step-up operation of the conventional charge pump circuit is described as follows.

The power supply voltage VDD applied to the anode of the diode D01 is dropped by the diode D01 to be a voltage of (VDD−Vf) at a connection point AA. First, the capacitor C01 is charged based on the voltage (VDD−Vf) at the connection point AA when a voltage level of the clock pulse CLK2 is the ground voltage. Next, when the voltage level of the clock pulse CLK2 becomes VDD, the voltage at the connection point AA increases to (2VDD−Vf). On this occasion, the voltage level of the clock pulse CLKX2 is the ground voltage. Therefore, the voltage at the connection point BB becomes the voltage of (2VDD−2Vf) that is a voltage of the voltage (2VDD−Vf) at the connection point AA, which is dropped by the diode D02.

When the clock pulses CLK2 and CLKX2 are inverted, the voltage at the connection point BB becomes (3VDD−2Vf) by the same voltage step-up operation as that described above. Further, this operation is repeated until a voltage at a connection point CC becomes (4VDD−3Vf).

The voltage of (4VDD−3Vf) at this connection point CC is dropped by the diode D04 to become the stepped-up voltage of (4VDD−4Vf) at the output terminal DD.

The power supply voltage VDD is stepped up when a series of voltage step-up operations as described above is repeatedly performed (see Japanese Patent Application Laid-Open No. 2002-233134, for example).

However, since each of the diodes has a temperature characteristic, the forward voltage Vf generated in each of the diodes decreases when the temperature rises while the forward voltage Vf increases when the temperature drops. Therefore, if the temperature varies, the stepped-up voltage (4VDD−4Vf) as the output voltage of the charge pump circuit is also varied.

SUMMARY OF THE INVENTION

The present invention has been made in view of the above-mentioned problems, and it is an object of the present invention to provide a charge pump circuit capable of delivering a stepped-up voltage as an output voltage that is hardly varied even if a temperature varies.

A charge pump circuit according to the present invention has a circuit structure in which a charge transfer device for correction generates a voltage corresponding to a voltage which is dropped by a charge transfer device, so the generated voltage is added to an input voltage of the charge pump circuit, and a voltage amplitude of a clock pulse for the voltage step-up operation has a value based on the input voltage.

Since the charge pump circuit according to the present invention has the circuit structure described above, the output voltage of the charge pump circuit does not include the amount of the voltage drop due to the charge transfer device. Therefore, it is possible to obtain the effect that a temperature characteristic of the charge transfer device does not affect the output voltage of the charge pump circuit.

DETAILED DESCRIPTION OF THE PREFERRED EMBODIMENTS

Hereinafter, a charge pump circuit according to the present invention is described with reference to the attached drawings.

Figure 1:
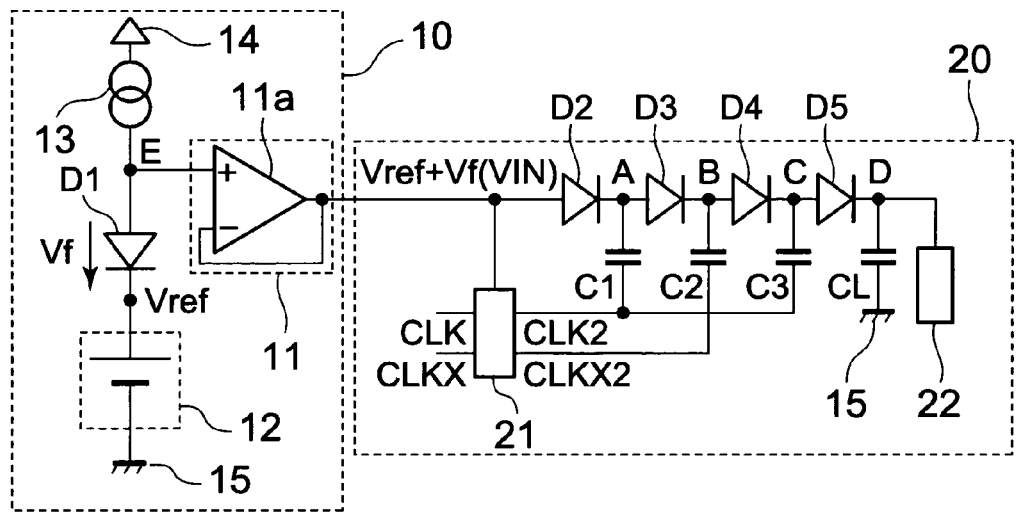
FIG. 1 is a diagram illustrating a charge pump circuit according to the present invention.

FIG. 1 is a circuit diagram of the charge pump circuit according to the present invention.

The charge pump circuit according to the present invention includes an input voltage generating circuit 10 and a voltage step-up circuit 20. The input voltage generating circuit 10 includes a buffer amplifier 11, a constant voltage circuit 12, a constant current source (constant current circuit) 13, a power supply terminal 14, a ground terminal 15, and an adjusting diode (charge transfer correction device) D1. The buffer amplifier 11 is an amplifier circuit with an amplification factor 1 and is made up of a voltage follower 11a, for example. The voltage step-up circuit 20 includes a clock driver 21, an output load 22, diodes (charge transfer devices) D2 to D5, capacitors C1 to C3, and an output capacitor CL.

As to the input voltage generating circuit 10, one end of the current source 13 is connected to the power supply terminal 14, and another end of the current source 13 is connected to the anode of the adjusting diode D1 (connection point E). The cathode of the adjusting diode D1 is connected to one end of the constant voltage circuit 12, and another end of the constant voltage circuit 12 is connected to the ground terminal 15. The connection point E is connected to a noninverting input terminal of the voltage follower 11a, and the output terminal of the voltage follower 11a is connected to an inverting input terminal of the voltage follower 11a. The constant voltage circuit 12 is constituted by using a band gap reference circuit for generating a constant voltage based on a band gap voltage of a PN junction of a semiconductor device, for example.

As to the voltage step-up circuit 20, an output terminal of the voltage follower 11a is connected to the anode of a diode D2, and the cathode of the diode D2 (connection point A) is connected to the anode of a diode D3. The cathode of the diode D3 (connection point B) is connected to the anode of a diode D4, and the cathode of the diode D4 (connection point C) is connected to the anode of the diode D5. The cathode of the diode D5 (output terminal D) is connected to the output capacitor CL and the output load 22. In other words, the diodes D2 to D5 are connected in series between the input terminal and the output terminal of the voltage step-up circuit 20. The power supply terminal of the clock driver 21 is connected to the output terminal of the voltage follower 11a. A capacitor C1 is disposed between the connection point A and a first output terminal of the clock driver 21, a capacitor C3 is disposed between the connection point C and the first output terminal of the clock driver 21, and a capacitor C2 is disposed between the connection point B and a second output terminal of the clock driver 21. In other words, first capacitor groups including the capacitor C1 and the capacitor C3 are disposed alternately at the nodes of the diodes D2 to D5, and a second capacitor group including the capacitor C2 are disposed at the nodes of the diodes D2 to D5 at which the first capacitor groups are not disposed.

Here, the charge pump circuit steps up the input voltage VIN generated by the input voltage generating circuit 10 from the power supply voltage, by using the clock pulses CLK2 and CLKX2 generated by the clock driver 21 of the voltage step-up circuit 20. The diodes D2 to D5 work as charge transfer devices and blocking devices. The adjusting diode D1 and the diodes D2 to D5 generate the forward voltage (correction voltage) Vf. The adjusting diode D1 has the same shape as the diodes D2 to D5 and is disposed to be adjacent to the diodes D2 to D5 on a mask layout. Therefore, the adjusting diode D1 has substantially the same characteristic as the diodes D2 to D5.

The clock driver 21 converts the input clock pulses CLK and CLKX into the clock pulses CLK2 and CLKX2 having the voltage amplitude based on the power supply voltage (Vref+Vf). The clock pulses CLK and CLKX and the clock pulses CLK2 and CLKX2 have the opposite phases to each other, respectively. The clock pulse CLK2 is supplied to the capacitor C2 and the capacitor C4. The clock pulse CLKX2 is supplied to the capacitor C3. The stepped-up voltage is delivered from the cathode of the diode D5 and is accumulated in the output capacitor CL.

Figure 2:
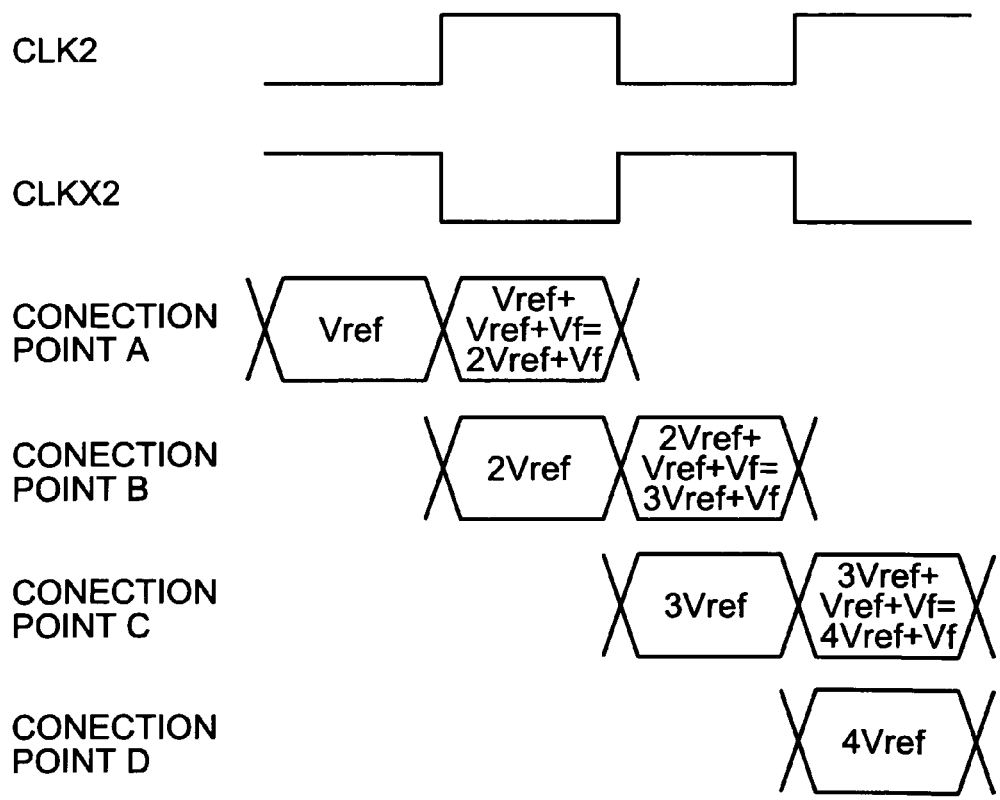
FIG. 2 is a diagram illustrating a voltage step-up operation of the charge pump circuit according to the present invention.
Figure 3:
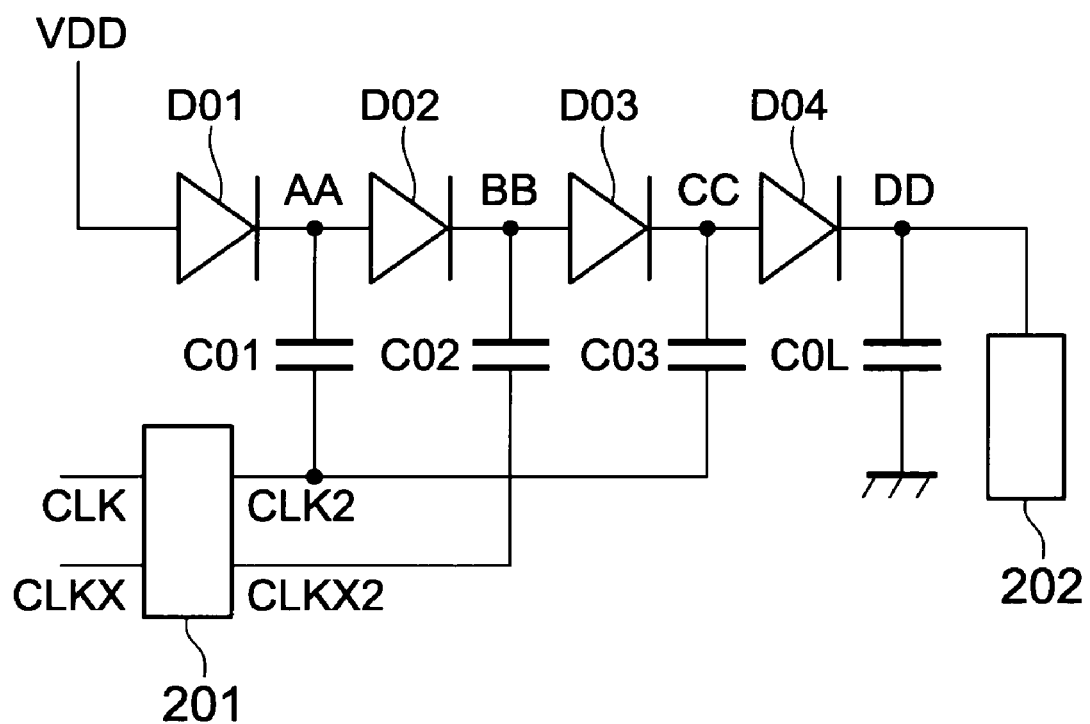
FIG. 3 is a diagram illustrating a conventional charge pump circuit.

Next, the voltage step-up operation of the charge pump circuit is described. FIG. 2 is a diagram illustrating the voltage step-up operation of the charge pump circuit according to the present invention.

The current source 13 supplies a constant current to the adjusting diode D1 and the constant voltage circuit 12. The constant voltage circuit 12 generates a constant voltage Vref, and the adjusting diode D1 generates the forward voltage Vf. Therefore, the voltage at the connection point E becomes a voltage value (Vref+Vf) that is a sum of the constant voltage Vref and the forward voltage Vf generated by the adjusting diode D1. This voltage (Vref+Vf) is supplied via the voltage follower 11a to the input terminal of the voltage step-up circuit 20 as the input voltage VIN to the voltage step-up circuit 20. The input terminal of the voltage step-up circuit 20 is connected to the anode of the diode D2 and the power supply terminal of the clock driver 21. Therefore, voltage amplitude of the clock pulse of the clock driver 21 becomes the power supply voltage (Vref+Vf) from the ground voltage.

The input voltage (Vref+Vf) supplied to the anode of the diode D2 is dropped by the diode D2 to become the voltage of (Vref) at the connection point A. First, when the voltage of the clock pulse CLK2 is the ground voltage, electric charge based on the voltage (Vref) at the connection point A is accumulated in the capacitor C2. Next, when the voltage of the clock pulse CLK2 becomes (Vref+Vf), the voltage at the connection point A increases to (2Vref+Vf). On this occasion, the voltage of the clock pulse CLKX2 is the ground voltage. Therefore, the voltage at the connection point B becomes a voltage of (2Vref) that is the voltage (2Vref+Vf) at the connection point A, which is dropped by the diode D3.

Next, when the voltage of the clock pulse CLK2 becomes the ground voltage and the voltage of the clock pulse CLKX2 becomes (Vref+Vf), the voltage at the connection point B becomes (3Vref+Vf). Therefore, the voltage at the connection point C becomes (3Vref) since the voltage of the clock pulse CLK2 is the ground voltage.

Further, when the voltage of the clock pulse CLK2 becomes (Vref+Vf), the voltage at the connection point C becomes (4Vref+Vf). Therefore, the voltage at the connection point D becomes a voltage of (4Vref) that is the voltage (4Vref+Vf) at the connection point C, which is dropped by the diode D5.

As a series of voltage step-up operations as described above is repeatedly performed, the constant voltage Vref is stepped up. Then, the stepped-up output voltage becomes (4Vref), which does not include the voltage Vf corresponding to the amount of the voltage drop due to each of the diodes D2 to D5.

Since the charge pump circuit of the present invention has the circuit structure described above, the stepped up output voltage does not include the forward voltage Vf due to each of the diodes D2 to D5. Therefore, the output voltage of the charge pump circuit according to the present invention is not affected by the temperature characteristic of the diode, so a stable stepped-up voltage can be obtained.

In addition, since the constant voltage Vref of the constant voltage circuit 12 is stepped up, the stepped-up voltage does not have a dependence on the power supply voltage of the power supply terminal 14. In other words, it is possible to obtain the stepped-up voltage that is stable even in a case of a variation of the power supply voltage.

Although the diodes D2 to D5 are used as the charge transfer device, MOS transistors may be used instead. In this case, an adjusting MOS transistor is used instead of the adjusting diode D1.

In addition, although the voltage follower 11a is used as the buffer amplifier 11 for output of the input voltage generating circuit 10, it is sufficient to be an amplifier having an amplification factor 1, so a source follower may be used instead, for example.

In addition, although the three-stage charge pump circuit is exemplified in the above description, it is apparent that the effect can be obtained irrespective of the number of stages.

Here, the case where the charge pump circuit described above is used as a peripheral circuit of a memory cell of a nonvolatile memory such as an EEPROM is described without a drawing.

The nonvolatile memory stores information by adjusting a quantity of electric charge accumulated in a floating gate so that a threshold value of the memory cell is changed.

In general, the nonvolatile memory includes a charge pump circuit so as to generate a write voltage for the memory cell. Then, injection of electrons into a floating gate is performed by the write voltage through a tunnel oxide film. A quantity of electric charge accumulated in the floating gate is adjusted by the injection or discharge of electrons, so the threshold value of the memory cell is changed. This write operation is performed in such a procedure as to set write data, generate the write voltage, and apply the write voltage to the memory cell. The generation of the write voltage and the application of the write voltage to the memory cell are managed on a time basis in general.

Here, since the stepped-up voltage of the conventional charge pump circuit includes the voltage Vf which is dropped by the diode, the stepped-up voltage varies in accordance with temperature. In addition, since the charge transfer rate of the diode varies in accordance with temperature, a rising speed of the stepped-up voltage also varies. If the rising speed of the stepped-up voltage is too fast, a period of time while the write voltage is applied to the memory cell becomes longer. Therefore, an excessive stress is exerted on the memory cell, so the memory cell may be deteriorated. On the other hand, if the rising speed of the stepped-up voltage is too slow, the period of time while the write voltage is applied to the memory cell becomes shorter. Therefore, the write operation of the memory cell may be insufficient. However, since the charge pump circuit according to the present invention can suppress a variation of the rising speed of the stepped-up voltage caused by a change of temperature, it is possible to control a write time appropriately. Therefore, it is possible to provide a nonvolatile memory that has little deterioration of the memory cell and can stably perform a write data operation into the memory cell.

What is claimed is:

1. A charge pump circuit comprising:
a constant current circuit for generating a constant current;
a charge transfer correction device for generating a correction voltage based on the constant current;
a constant voltage circuit for generating a constant voltage;
a buffer amplifier for outputting an input voltage obtained by adding the correction voltage from the charge transfer correction device to the constant voltage from the constant voltage circuit;
a plurality of charge transfer devices connected in series to an output terminal of the buffer amplifier, each of the charge transfer devices being made of the same element as and having substantially the same characteristic as that of the charge transfer correction device;
a plurality of capacitors each having one end connected to each connection point of each of the plurality of charge transfer devices; and
a clock driver for using the input voltage as a power supply voltage, generating clock pulses having opposite phases based on the power supply voltage, and alternately supplying the clock pulses to another end of each of the plurality of capacitors.

2. A charge pump circuit according to claim 1; wherein the charge transfer correction device and the plurality of charge transfer devices are diodes.

3. A charge pump circuit according to claim 1; wherein the charge transfer correction device and the plurality of charge transfer devices are MOS transistors.

4. A charge pump circuit according to claim 1; wherein the constant voltage circuit comprises a band gap reference circuit.

5. A charge pump circuit according to claim 1; wherein the charge transfer correction device has the same shape as the plurality of charge transfer devices and is disposed to be adjacent to each of the plurality of charge transfer devices on a mask layout.

6. A charge pump circuit according to claim 1; wherein the buffer amplifier is a voltage follower.

7. A charge pump circuit according to claim 1; wherein the buffer amplifier is a source follower.

8. A nonvolatile memory comprising:
a memory cell; and
a charge pump circuit according to claim 1 for generating a write voltage for the memory cell.

9. A charge pump circuit comprising:
an input voltage generating circuit comprised of a constant current circuit that generates a constant current, a charge transfer correction device that generates a correction voltage based on the constant current, a constant voltage circuit that generates a constant voltage, and a buffer amplifier that outputs an input voltage obtained by adding the correction voltage from the charge transfer correction device to the constant voltage from the constant voltage circuit; and
a voltage step-up circuit comprised of a plurality of charge transfer devices connected to an output terminal of the buffer amplifier and made of the same element as and having substantially the same characteristic as that of the charge transfer correction device of the input voltage generating circuit, a plurality of capacitors each having one end connected to each connection point of each of the plurality of charge transfer devices, and a clock driver that uses the input voltage from the buffer amplifier as a power supply voltage to generate clock pulses having opposite phases and that alternately supplies the clock pulses to another end of each of the plurality of capacitors.

10. A charge pump circuit according to claim 9; wherein the charge transfer correction device and the plurality of charge transfer devices are diodes.

11. A charge pump circuit according to claim 9; wherein the charge transfer correction device and the plurality of charge transfer devices are MOS transistors.

12. A charge pump circuit according to claim 9; wherein the constant voltage circuit comprises a band gap reference circuit.

13. A charge pump circuit according to claim 9; wherein the charge transfer correction device has the same shape as the plurality of charge transfer devices and is disposed to be adjacent to each of the plurality of charge transfer devices on a mask layout.

14. A charge pump circuit according to claim 9; wherein the buffer amplifier is a voltage follower.

15. A charge pump circuit according to claim 9; wherein the buffer amplifier is a source follower.

16. A nonvolatile memory comprising:
a memory cell; and
a charge pump circuit according to claim 9 for generating a write voltage for the memory cell.

17. A nonvolatile memory according to claim 16; wherein the charge transfer correction device and the plurality of charge transfer devices of the charge pump circuit are diodes.

18. A nonvolatile memory according to claim 16; wherein the charge transfer correction device and the plurality of charge transfer devices of the charge pump circuit are MOS transistors.

19. A nonvolatile memory according to claim 16; wherein the constant voltage circuit of the charge pump circuit comprises a band gap reference circuit.

20. A nonvolatile memory according to claim 16; wherein in the charge pump circuit, the charge transfer correction device has the same shape as the plurality of charge transfer devices and is disposed to be adjacent to each of the plurality of charge transfer devices on a mask layout.

21. A nonvolatile memory according to claim 16; wherein the buffer amplifier of the charge pump circuit is a voltage follower.

22. A nonvolatile memory according to claim 16; wherein the buffer amplifier of the charge pump circuit is a source follower.

* * * * *